Aug. 23, 1927.
W. C. BAXTER
1,640,025
WHEEL MOUNTING FOR CRIBS OR THE LIKE
Filed May 22, 1926
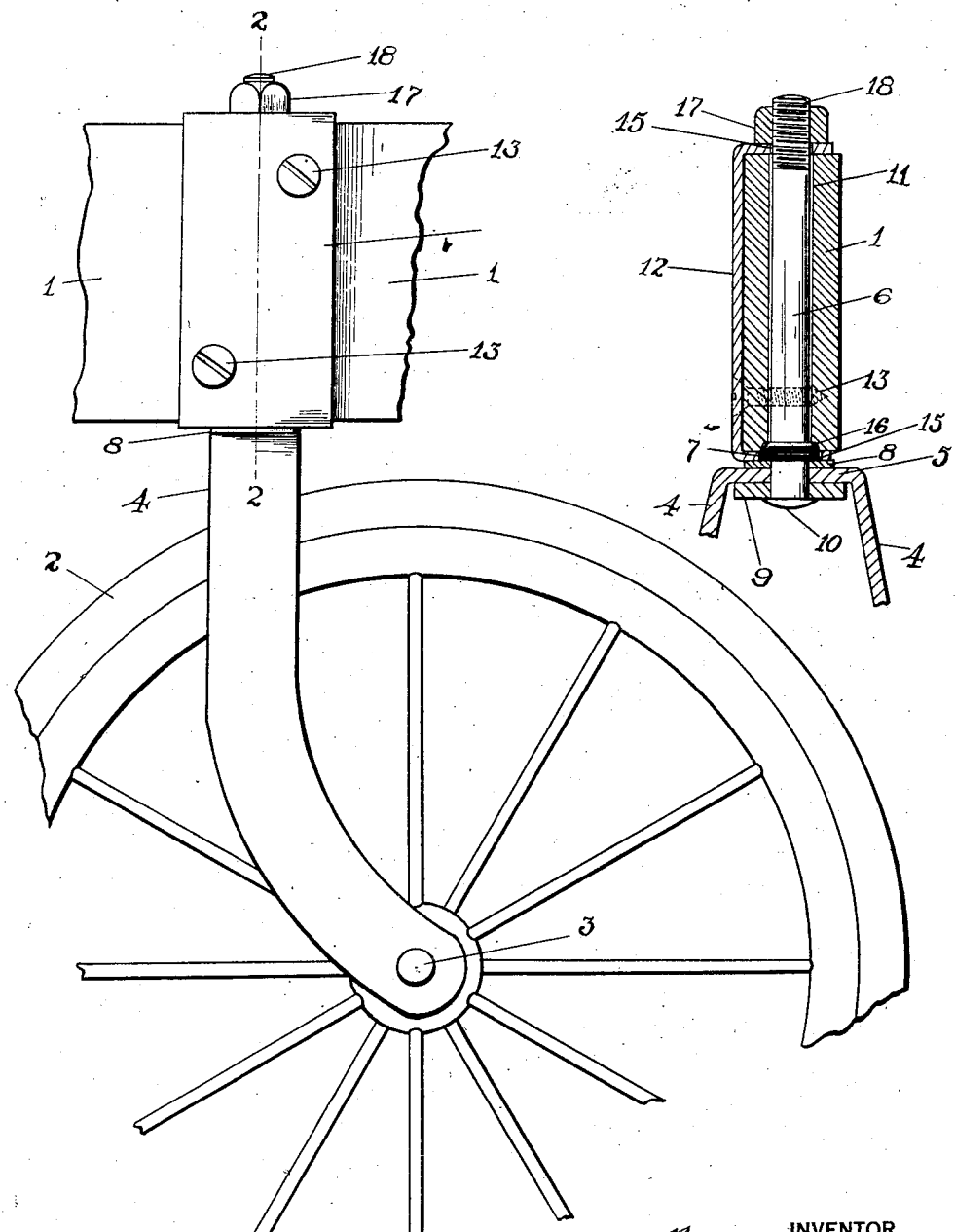
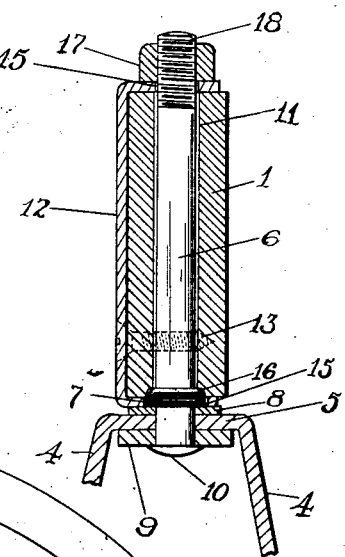
INVENTOR
William C. Baxter
BY
Davis & ?
his ATTORNEYS Patented Aug. 23, 1927.

1,640,025

UNITED STATES PATENT OFFICE.

WILLIAM C. BAXTER, OF ROCHESTER, NEW YORK, ASSIGNOR TO E. M. TRIMBLE MFG. COMPANY, INC., OF ROCHESTER, NEW YORK, A CORPORATION OF NEW YORK.

WHEEL MOUNTING FOR CRIBS OR THE LIKE.

Application filed May 22, 1926. Serial No. 110,881.

The present invention relates to a wheel mounting for cribs or the like and an object of the invention is to provide a construction which may be effectively and economically secured to the lower frame of the horizontal bar of the frame of the crib or other structure.

To this and other ends, the invention consists of certain parts and combinations of parts, all of which will be hereinafter described; the novel features being pointed out in the appended claims.

In the drawings:—

Fig. 1 is a side view of the mounting; and

Fig. 2 is a section on the line 2—2, Fig. 1.

Referring more particularly to the drawings, 1 indicates a lower horizontal bar of a rectangular side frame of a crib and 2 indicates a wheel which is mounted on the shaft 3 supported by the ends of the arms of an inverted U shaped frame 4. These arms are connected at their upper ends by a cross piece 5 which supports a pintle 6. In this instance, this pintle has an annular flange 7 in spaced relation to its lower end and this flange has its underside forming a shoulder which abuts a washer 8 resting on the upper surface of the connecting portion 5. The portion of the pintle below the flange also extends through an opening in the cross piece 5 and an opening in the washer 9, its lower end being upset at 10 over the washer 9 so as to anchor the pivot pin 6 in the cross piece 5 of the yoke or wheel supporting frame 4.

The lower horizontal bar 1 of the side frame has a vertical opening 11. A reinforcing and bearing member preferably of U shaped construction has a connecting portion 12 secured by screws 13 to the outer face of this horizontal bar and has perforated arms 14 extending over the top and bottom of the bar and provided with openings 15, the opening in the lower arm being larger than the openings in the upper arm and having bearing on the annular flange 7, this annular flange being thicker than the plate and extending into a countersunk portion 16 in the bar 1 to abut the bar 1. The upper arm of the bearing member turns on the pintle 6. A nut 17 is secured on the screw-threaded end 18 of the pintle 6 and holds the wheel frame to the horizontal bar 1, said nut engaging the upper surface of the upper arm of the bearing member.

The pintle is secured to the wheel supporting frame in a strong and durable manner and the annular flange thereon not only acts as a shoulder, but it serves as a bearing for cooperating with a bearing member secured to the horizontal bar or other supporting means on the object to be sustained. The bearing member is preferably of U shape to provide arms cooperating with the pintle above and below the part through which the pintle extends.

What I claim as my invention and desire to secure by Letters Patent is:

1. The combination with a part having an opening, of a U shaped bearing member having arms lying in abutment with opposite sides of said part and provided with openings aligned with the openings in said part, a wheel supporting frame having its movement limited in one direction by the lower arm of the U shaped bearing member, and a pintle extending through said opening and having bearing in the arms of the bearing member.

2. The combination with a part provided with an opening, of a wheel supporting frame having two arms and a connecting portion between the arms provided with an opening, two washers arranged on opposite sides of the connecting portion and provided with openings, a pintle having an annular flange projecting below said flange through the washers and the opening of the connecting portion of the wheel supporting frame, said pintle extending through the opening of the first mentioned part, and a U shaped bearing member having two arms lying above and below the first mentioned part, said arms having openings aligned with the opening in the first mentioned part, and the lower one of the arms resting upon the washer above the connecting portion of the wheel supporting frame and bearing upon the annular flange and the other arm of the bearing frame having the pintle projecting therethrough.

3. The combination with a part having a vertical opening provided with a countersunk portion at its lower end, of a U shaped frame having two arms, each provided with an opening, one of the arms lying above the first mentioned part with its opening aligned with the upper end of the opening in said first mentioned part and the other arm lying below the first mentioned part with its opening aligned with the counter-sunk portion of the first mentioned part, both of said arms lying in abutment with the first mentioned part, a wheel supporting frame having its movement limited by the lower arm of the U shaped frame, and a pintle carried by said wheel supporting frame and extending through the opening in the first mentioned part, said pintle having an enlargement at its lower end extending into the counter-sunk portion and having bearing in the opening of the lower arm of the bearing member.

WILLIAM C. BAXTER.